INVENTOR
LOUIS F. LANGHURST

April 19, 1949.  L. F. LANGHURST  2,467,435
SOLVENT RECOVERY DISTILLATION SYSTEM
Filed Aug. 25, 1944  3 Sheets-Sheet 2
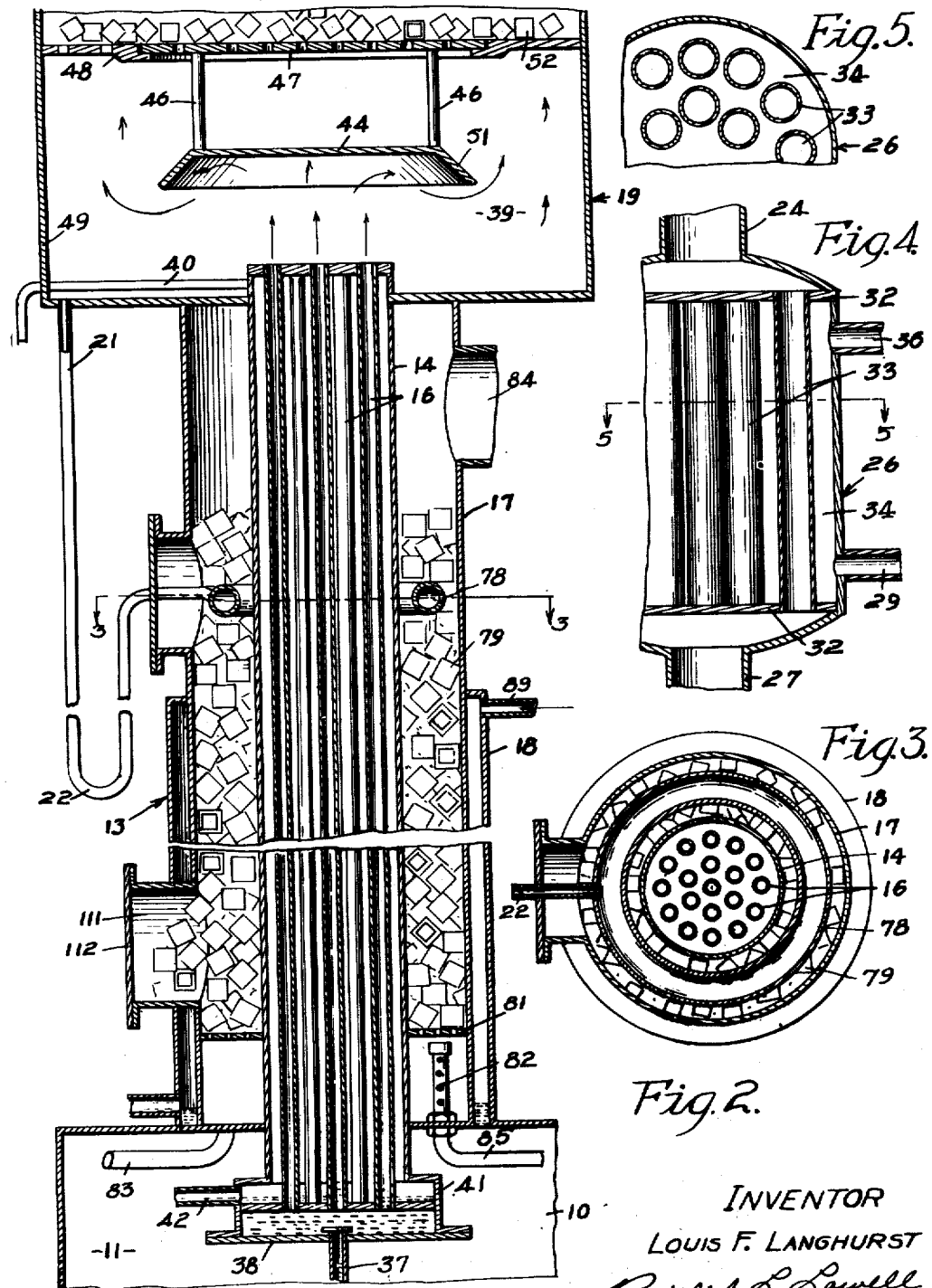
INVENTOR
LOUIS F. LANGHURST
by Rudolph L. Lawell
atty

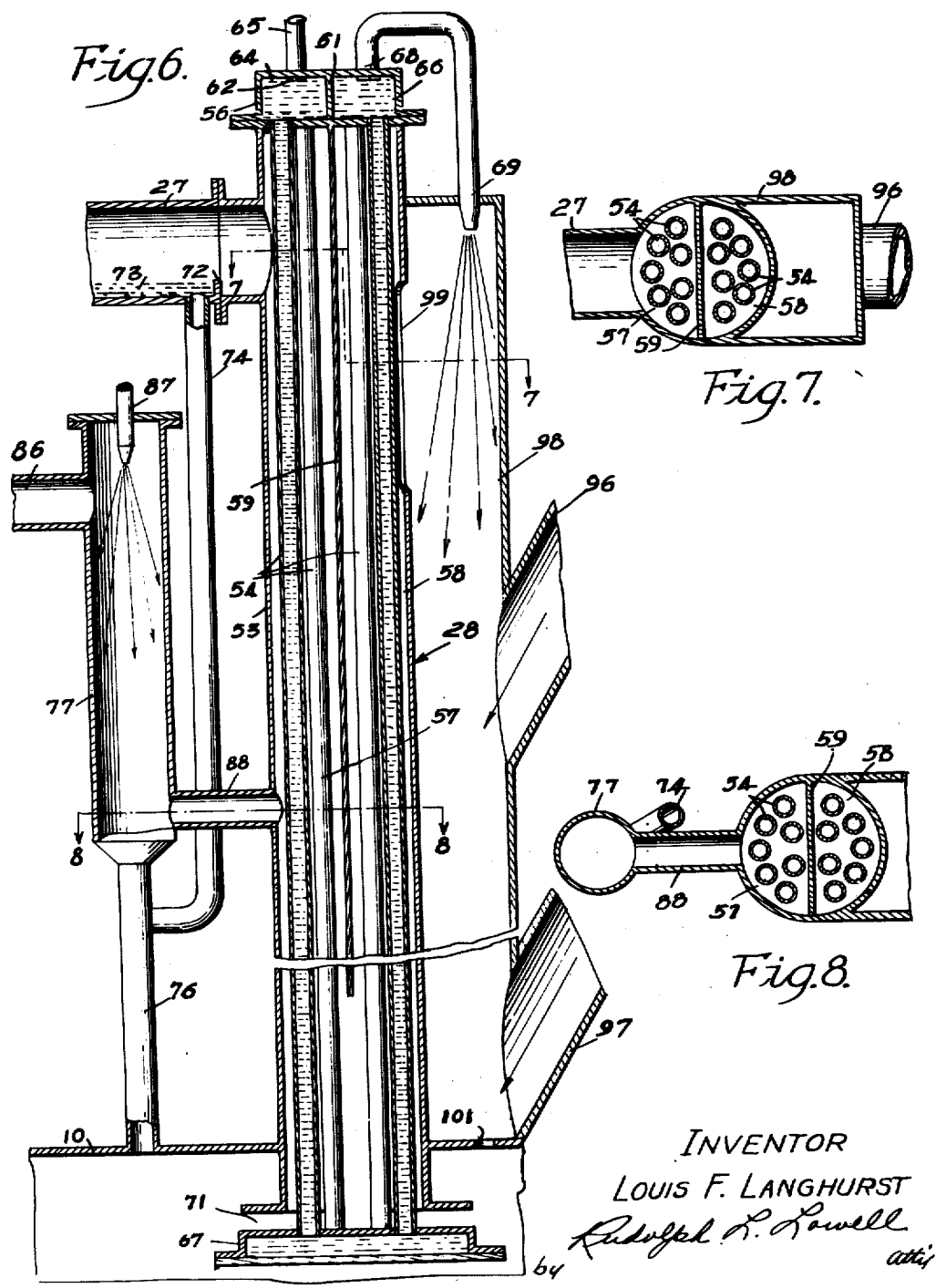

Patented Apr. 19, 1949

2,467,435

UNITED STATES PATENT OFFICE 2,467,435

SOLVENT RECOVERY DISTILLATION SYSTEM

Louis F. Langhurst, Cedar Rapids, Iowa, assignor, by mesne assignments, to The V. D. Anderson Company, Cleveland, Ohio, a corporation of Ohio Application August 25, 1944, Serial No. 551,243

19 Claims. (Cl. 202—173)

This invention relates generally to the recovery of a solvent from a solvent-oil mixture and in particular to a system for recovering solvent from the miscella and meal produced in a solvent extraction of oil from soy beans, flax seed and the like.

Systems now in use for recovering solvent from miscella and a meal preparation having solvent therein, are generally bulky and complicated and not entirely satisfactory in their over-all operation. In many instances the apparatus elements of these systems are spread large distances apart and are assembled in a building so as to include two stories of the building. By virtue of the high explosive nature of the solvent generally used in the extraction of oil from soy beans, as for example hexane, the assembly of the system in a building creates a potential fire hazard due to the escape of solvent from the system. Further the spreading apart of the apparatus comprising the system provides considerable inconvenience to a proper observation of the operation of the system, and the provision of a conveniently or centrally located control room for the system.

In the recovery of solvent from the meal remaining from the extraction process considerable difficulties have been encountered heretofore because of the entrainment of meal dust in the solvent vapor driven from the meal in the usual meal-drier tubes. When the solvent vapor with entrained meal dust is passed through a solvent condenser the meal dust soon clogs the passages between the cooling coils or tubes of the condenser so as to necessitate frequent stoppages in the operation of the system for condenser cleaning purposes. It is apparent also that the collecting of the meal dust about the condenser cooling tubes is a continuous procedure so that the overall operating efficiency of the condenser is appreciably reduced. Filters for removing the meal dust entrained in the solvent vapor from the meal drier tubes, prior to condensing the solvent vapor, have been used. However, this procedure has resulted merely in having a meal dust clogging condition in a filter rather than in a condenser.

It is an object of this invention, therefore, to provide an improved system for recovering solvent from an oil-solvent mixture.

Another object of this invention is to provide a system for recovering solvent from a meal preparation in which meal dust entrained with the solvent vapors driven from the meal preparation are continuously removed from the system so as to prevent any clogging condition in the system.

A further object of this invention is to provide a system for the recovery of solvent from an oil-solvent mixture which is capable of continuous operation over prolonged periods of time with a minimum of service attention, adapted to be assembled in a compact unit for ready observation of its operation, and capable of being efficiently operated in the open or out-of-doors whereby to eliminate fire hazards arising from escaping solvent vapors.

A feature of this invention is found in the provision of a solvent vaporizing column including in combination a calandria, a solvent stripping column and an enclosing steam jacket, with the stripping column positioned about the calandria, and with the steam flow through the calandria and stripping column being in a counter-flow relation whereby to maintain these parts at a solvent vaporizing temperature over substantially their complete lengths.

Yet another feature of this invention is found in the provision of a single main condenser for finally condensing solvent vapors produced in a calandria, in a solvent stripping column, and in a meal drier tube.

A further feature of this invention is found in the provision, for a meal drier tube, of a downwardly inclined solvent vapor outlet connected with an upright hollow member having its upper end open to a solvent vapor condenser and its lower end open to a water-solvent separator. Cold water spray means carried in the drier tube outlet and in the hollow member are adapted to spray water downwardly over substantially the complete lengths thereof whereby to wash any meal dust from the solvent vapor prior to the passage of any solvent vapor into the condenser, with the water, meal dust and solvent condensate travelling into the water-solvent separator.

Another feature of this invention is found in the provision of a distillation equipment skirt having a water-solvent separator therein, and a vent condenser and a main solvent vapor condenser supported on the skirt immediately above the water-solvent separator whereby the usual piping required between the condensers and the water-solvent separator is entirely eliminated.

Further objects, features and advantages of this invention will become apparent from the following description when taken in connection with the accompanying drawings in which:

Fig. 2 is a shortened longitudinal sectional view of the solvent vaporizing column used in the solvent recovery system of this invention;

Fig. 3 is a transverse sectional view of the vaporizing column taken along the line 3—3 in Fig. 2;

Fig. 4 is a fragmentary longitudinal sectional view of a heat exchange unit for pre-heating miscella prior to its introduction into the solvent vaporizing column;

Fig. 5 is a fragmentary transverse sectional view of the heat exchange unit as seen on the line 5—5 in Fig. 4;

Fig. 6 is a shortened longitudinal sectional view of the main solvent vapor condenser unit used in the system of this invention;

Fig. 7 is a sectional view on the line 7—7 in Fig. 6; and

Fig. 8 is a sectional view taken on the line 8—8 in Fig. 6.

Figure 1:
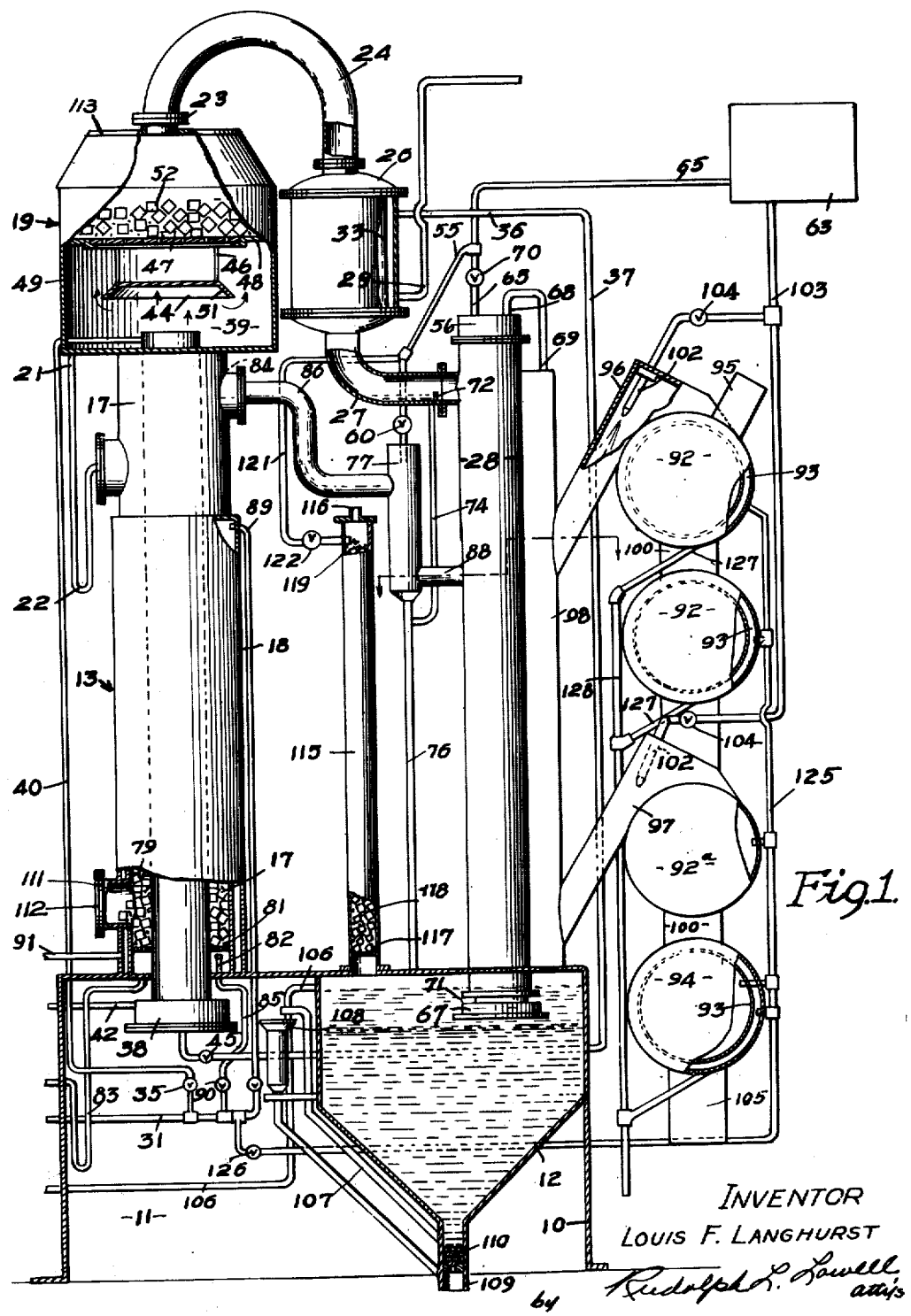
Fig. 1 is a diagrammatic view of the complete solvent recovery system of this invention with certain parts shown in section for the purpose of clarity.

With reference to the drawings the solvent recovery system of this invention is shown in Fig. 1 as including a hollow base unit or distillation equipment skirt 10, of a substantially circular form, having a control chamber 11 adjacent one end and a water-solvent separator 12 adjacent an opposite end. An upright solvent vaporizing column, indicated generally as 13, is supported on the base unit 10 above the control chamber 11 and comprises a calandria 14 of a usual circular form having upright tubes 16, (Figs. 1 and 2), providing parallel channels for the flow of miscella therethrough, and a chamber surrounding said tubes, but within the calandria, providing a channel through which heating fluid may be circulated or caused to flow. Concentrically positioned about the calandria 14 are a solvent stripping column 17 and a steam jacket 18, with the stripping column 17 being arranged between and in a heat exchange relation with the calandria 14 and the steam jacket 18. The upper end of the steam jacket 18 terminates below the upper ends of the calandria 14 and the stripping column 17.

Carried at the upper end of the vaporizing column 13 is an oil entrainment separating unit 19 having an oil outlet 21 connected through a looped pipe 22 to the stripping column 17, and a solvent vapor outlet 23 connected through a conduit 24, a heat exchange unit 26 and a conduit 27 to the upper end of an upright main solvent condenser 28 which is supported on the base unit 10 oppositely from the vaporizing column 13 and above the water-solvent separator 12.

The heat exchange unit 26 (Figs. 1, 4 and 5) comprises upright tubes 33 extended through vertically spaced plate members 32, with the space 34 about the tubes being closed by the plate members 32. An oil-solvent mixture, such as miscella, is introduced into the heat exchange unit 26 through an inlet 29 open to the space 34 adjacent the lower ends of the tubes 33. The miscella flows upwardly about the tubes and outwardly from the heat exchange unit 26 through an outlet 36 connected to the space 34 at the upper ends of the tubes 33.

Solvent vapor in the conduit 24 flows downwardly through the tubes 33 in a counter flow relation with the miscella travelling upwardly about the tubes, with the heat from the solvent vapor acting to pre-heat the miscella (Figs. 1 and 2). In turn a portion of the solvent vapor passing through the heat exchange unit 26 is condensed so that the heat exchange unit functions as a miscella pre-heater, and as a primary condenser relative to the solvent vapor passing from the oil entrainment separator 19 through the conduit 24, as will be later explained.

The pre-heated miscella from the heat exchange unit 26 is carried through a pipe 37 to a header 38 at the bottom of the calandria 14 which header is open to the lower ends of the calandria tubes 16 for flow upwardly through the tubes, and into a chamber 39 of the oil separating unit 19, the chamber 39 being open to the upper ends of the tubes 16 and defined by a casing member 43. The supply of miscella to the calandria is controlled by a valve 45 connected in the pipe 37 and located in the chamber 11.

Steam is admitted into the upper end of the heating chamber or channel of the calandria 14 through a pipe 40 connected with a main feed line 31, fed from a suitable source of steam supply (not shown). The flow of steam into the calandria is controlled by a valve 35 connected in the pipe 40 and located in the control chamber 11. This steam flows through the channels about the tubes 16 and downwardly of the calandria in a counter-flow relation with the oil-solvent mixture flowing upwardly through the tubes 16. Steam condensate in the calandria is collected in a water header 41 located above the miscella header 38, and having an outlet 42.

On passage of the miscella upwardly through the calandria 14 the solvent is vaporized so that a mixture of solvent vapor with entrained oil particles is discharged or emitted from the upper ends of the calandria tubes 16 and into the chamber 39. The entrained oil is separated from the solvent vapor in the oil separating unit 19 by means located within the chamber 39 and including an inverted dish-shaped baffle member 44 suspended from rods 46 which are carried on a perforated plate member 47. The plate member 47 is supported at its marginal edge on the inner periphery of a perforated flat ring member 48 positioned about the inner periphery of the wall or casing 49. The plate member 44 is concentrically located relative to the calandria 14 and is of a greater diameter than the calandria with the flange 51 being in a spaced relation above and outwardly from the outer periphery of the calandria.

The solvent vapor from the calandria tubes 16 moves upwardly to the bottom of the plate member 44 and then along the bottom of the plate member 44 and upwardly about the flange 51, as indicated by arrows in Figs. 1 and 2. The oil entrained in the solvent vapor contacts the plate member 44 and flange 51 and then drops downwardly to the bottom of the chamber 39. This oil passes outwardly from the chamber through the outlet 21 and into the stripping column 17 for a purpose which will be later explained.

The solvent vapor travelling upwardly in the chamber 39 from the inverted dish member 44 flows through the perforated plate 47 and ring 48 and through a thickness or layer of ferrules or Raschig tubes 52 supported on the plate member 47 and ring 48. The Raschig tubes 52, as is well known in the art, provide a large surface area over which the solvent vapor passes whereby any oil particles which might be entrained in the solvent vapor is collected on the Raschig tubes for later dropping to the bottom of the chamber 39. The solvent vapor at the top of the chamber 39 is thus free of entrained oil and flows through the outlet 23 and into the conduit 24 to the heat exchange unit 26.

As was previously explained the solvent vapor passing into the heat exchange unit 26 is partially condensed by the cooling action of the miscella flowing through the heat exchange unit so that a mixture of solvent vapor and solvent condensate enters the conduit 27 which connects the heat exchange unit 26 with the main solvent condenser 28. The condenser 28 includes a cylindrical housing or casing 53 having a plurality of longitudinally extended tubes 54 arranged therein in a spaced relation. The upper ends of the tubes 54 are open to a cold water header 56 located at the top of the condenser 28, and the lower ends of the tubes 54 are open to a water header 67 at the bottom of the condenser 28. A longitudinally extended partition member 59 divides the condenser into two longitudinally extended condenser portions or sections 57 and 58. The partition member 59 terminates above the lower end of the condenser 28 whereby the condenser sections 57 and 58 are connected together adjacent their bottom ends. The water header 56 is divided into two chambers 64 and 66 by a partition wall 61, with the chamber 64 having an inlet 62 connected through a pipe 65 with a suitable source of cold water supply indicated at 63 in Fig. 1. The supply of water to the chamber 64 is controlled by a valve 70 connected in the pipe 65. With reference to Fig. 6 it is seen that the water from the chamber 64 flows downwardly through the condenser tubes 54 in the condenser section 57 to the water header 67, and then upwardly through the tubes 54 in the condenser section 58 to the water chamber 66 which has an outlet 68 connected with a water jet 69 which will be later explained.

The solvent vapor from the conduit 27 enters the condenser section 57 and passes downwardly about the tubes 54 in such section. The solvent vapor condensed in the condenser section 57 falls to the bottom of the condenser 28 and is admitted through an outlet 71 directly into the water-solvent separator 12. By virtue of the lower end of the condenser 28 being open to the water-solvent separator 12 through the outlet 71 these parts are compactly assembled, and pipe systems generally used to carry solvent condensate from the condenser to the separator 12 are entirely eliminated. Any solvent vapor not condensed in the condenser section 57 passes downwardly about the lower end of the partition member 59 and upwardly in the condenser section 58 where it is condensed. The solvent condensate in the section 58 also falls to the bottom of the condenser 28 and flows through the outlet 71 into the water-solvent separator.

As was previously mentioned a portion of the solvent vapor from the oil separating unit 19 is condensed in the heat exchange unit 26 and passes therefrom into the conduit 27. Since the admission of this solvent condensate into the condenser 28 would unnecessarily reduce the cooling function of the condenser 28 provision is made for by-passing this solvent condensate to the water-solvent separator 12 so that it does not enter the condenser 28. Thus as shown in Figs. 1 and 6 the conduit 27, adjacent the condenser 28, is horizontally extended and provided with a transversely extended baffle plate or dam member 72 adapted to collect solvent condensate, indicated at 73, at the bottom of the conduit 27. Connected with the conduit 27 rearwardly of the baffle member 72 is a solvent condensate outlet pipe 74 which is connected with the water-solvent separator 12 through a pipe member 76 constituting an outlet for a water jet solvent vapor or contact condenser 77 which will be described later on.

Although the oil separated from the solvent vapor in the unit 19 is substantially free of solvent, it does have some traces of solvent which are removed in the stripping column 17.

The oil pipe 22 connected with the oil outlet 21 of the chamber 39 is connected with an oil distributing means comprising a circular shaped pipe member 78 located horizontally within the stripping column 17 and supported in a spaced relation about the calandria 14 (Figs. 2 and 3). The outer side of the pipe member 78 is perforated so that oil therein is distributed uniformly about the stripping column 17 and dropped downwardly in the stripping column.

The stripping column 17 is filled with Raschig tubes 79 to at least the level of the pipe 78, so that the oil from the pipe 78 flows downwardly through the stripping column 17 about the tubes 79, which are supported on a perforated annular member 81 spaced upwardly from the bottom of the stripping column 17 and extended transversely across the stripping column between the calandria 14 and the steam jacket 18. Steam for heating the oil in the stripping column 17 is admitted through an inlet 82 at the lower end of the stripping column 17 and passes upwardly about the Raschig tubes 79 in a counter-flow relation with the oil from the pipe 78. Steam is supplied to the inlet 82 through a pipe 85, connected to the steam feed line 31, and having a control valve 90 located in the control chamber 11. The solvent free oil is collected at the bottom of the stripping column 17 below the supporting plate 81 from where it is pumped through an outlet 83 to a storage tank (not shown).

The steam passing upwardly through the stripping column 17 is mixed with the solvent vapor driven from the oil so that a mixture of steam and solvent vapor is present at the upper end of the stripping column 17. This steam and solvent vapor mixture flows from the stripping column through an outlet 84, adjacent the upper end of the stripping column, and into a conduit 86 connected with the water contact condenser 77 previously mentioned (Figs. 1 and 6).

The condenser 77 comprises an upright cylindrical casing member having the solvent condensate and water outlet 76 at its lower end. A cold water jet or spray means 87 is connected with the water supply 63 through pipes 55 and 65 and is adapted to project a spray of water in a direction downwardly of the condenser 77 as indicated by the arrows in Fig. 6. The supply of water to the spray 87 is controlled by a valve 60 connected in the pipe 55. The steam and a portion of the solvent vapor from the conduit 86 is condensed by the action of the water spray in the condenser 77 and flows together with the water from the spray 87 through the outlet 76 directly into the water-solvent separator 12. The portions of solvent vapor not condensed in the condenser 77 flow outwardly from the condenser through a pipe member 88 connected at one end with the condenser 77 at a position above the outlet 76, and at its opposite end with the condenser section 57 of the main condenser 28 (Figs. 6 and 8). The solvent vapor thus admitted into the condenser section 57 is condensed in all ways similar to the solvent vapors entering the condenser section 57 from the conduit 27.

It is seen, therefore, that the solvent vapor from the oil separating unit 19 is initially introduced through a heat exchange unit or primary condenser 26 to be partially condensed, and is then finally condensed in the main condenser 28. Likewise the solvent vapor and steam from the stripping column 17 is initially acted upon by the contact condenser 77 whereby the steam and portions of the solvent vapor are condensed, so that only solvent vapor is admitted into the main condenser unit 28 through the conduit 88. Further the portions of the solvent vapor condensed in the heat exchange unit 26 and contact condenser 77, and the steam condensate from the condenser 77 are by-passed directly into the water-solvent separator 12 and do not at any time enter the main condenser unit 28. The cooling effectiveness of the condenser 28 is thus retained for condensing only the solvent vapors not condensed in the heat exchange unit 26 and contact condenser 77.

By virtue of the relative assembly of the calandria 14, stripping column 17 and steam jacket 18 of the vaporizing column 13 these parts are capable of being arranged in a compact unit in which a maximum heating efficiency from the steam employed therein is accomplished. Thus as shown in Fig. 2 the steam admitted into the calandria 14 flows downwardly therethrough, and the steam admitted into the stripping column 17 through the outlet 82 flows upwardly through the stripping column and over substantially the complete length of the calandria 14. As a result the steam in the calandria is at a maximum temperature at the upper end of the calandria and tends to become gradually cooler as it travels toward the condensate outlet 42 in a counterflow relation with the miscella flowing upwardly in the calandria tubes 16. However, the steam in the stripping column 17 is at its maximum temperature at the bottom of the stripping column and becomes gradually cooler as it travels upwardly therethrough in a counter-flow relation with the oil dropped from the pipe or oil-distributing member 78. The steam jacket 18, which is positioned about the lower portion of the stripping column 17 has a steam inlet 89 at its upper end and a condensate outlet 91 at its lower end, so that the steam in the steam jacket travels in a counter-flow relation relative to the steam in the stripping column 17.

With the stripping column 17 in a heat exchange relation with the calandria 14 and the steam jacket 18, and the flow of steam in the stripping column counter to the steam flow in the calandria and steam jacket a substantially uniform high steam temperature is obtained throughout substantially the full lengths of the calandria and stripping column whereby a maximum vaporization of the solvent in these two parts is accomplished. Further the steam jacket 18 appreciably reduces the escape of heat from the stripping column 17 to the atmosphere.

In the solvent extraction of oil from an oil bearing seed, such as soy bean or flax seed, the seed is initially prepared in a flake form prior to being mixed with a solvent. The prepared seed, after oil has been removed from it, is generally referred to as "meal" and has an appreciable solvent content absorbed or retained therein, which is generally removed to provide for the use of the meal as an animal feed or the like. It is common practice to introduce the meal remaining from an extraction process into meal drier tubes which are indicated generally at 92 in Fig. 1. In these tubes the meal is agitated or mixed and concurrently heated to a temperature capable of vaporizing the solvent in the meal. The drier tubes 92 form no part of this invention and may follow a known construction. These tubes generally are of an elongated cylindrical construction with the tubes initially receiving the meal being heated by a steam jacket 93, indicated for the upper two drier tubes in Fig. 1, and the meal in other tubes, such as the tube indicated as 92a, being heated by a direct mixing with steam. The meal admitted into the drier tubes 92 is continuously mixed as it is moved from one end of a drier tube to the other so as to provide for a complete heating of all of the meal portions. The meal is introduced into the uppermost drier tube 92 and then progressively moved to next lower adjacent drier tubes. On passage of the meal, free of solvent, from the last drier tube 92a the meal is introduced into what is commonly referred to as a toaster 94 in which the meal is heated by a steam jacket 93 and by a direct mixing with steam.

As illustrated in Fig. 1 the uppermost drier tube has a meal inlet 95, with adjacent tubes 92 and the toaster 94 being connected together by solvent vapor and meal-carrying conduits 100, and the toaster tube having a meal outlet 105. Steam for the tubes 92 and toaster 94 is supplied through a common steam conduit 125 connected with the feed line 31, with the conduit 125 being provided with a control valve 126 located in the chamber 11. Steam condensate is removed from the jackets 93 through outlets 127 connected with a common drain or boiler feed water return line 128.

The upper two drier tubes 92 have a common solvent vapor outlet 96 while the drier tube 92a is provided with a solvent vapor and steam outlet 97. The outlets 96 and 97 are of a short length and inclined downwardly from a corresponding drier tube with their lower ends in fluid connection with a common upright manifold or hollow member 98 positioned against one side of the condenser 28 (Figs. 1, 6 and 7). An opening 99 connects the upper end of the manifold 98 with the upper end of the condenser section 58. The lower end of the manifold 98 opens directly to the water-solvent separator 12 through an opening 101.

In order to accomplish a condensing of the solvent vapor from the drier tubes 92 and 92a, while eliminating any passage of meal dust into the condenser 28, each outlet 96 and 97 is provided at its upper end with a water jet or spray means 102 adapted to direct a spray of cold water downwardly through the outlets 96 and 97 over their complete lengths. The jets 102 are connected to a common feed pipe 103 which in turn is connected with the cold water supply 63, with the supply of water to the jets being controlled through valves 104.

The water jet 69, previously mentioned in connection with the header 56 at the top of the condenser 28, extends through the upper end of the manifold 98 and is adapted to direct a spray of water downwardly through the manifold and across the opening 99. The solvent vapor with entrained meal dust from the drier tubes 92 enters the outlets 96 and 97 and is acted upon by the water sprayed from the jets 102, whereby the meal dust is washed from the solvent vapor concurrently with a condensation of a substantial portion of the solvent vapor in the outlets 96 and 97, and a condensation of steam in the outlet 97.

The portions of solvent vapor not condensed within the outlets 96 and 97 pass upwardly within the manifold 98 to be further washed and condensed by the water spray from the jet 69. The action of the sprays 69 and 102 efficiently removes all of the meal dust from the solvent vapor and condenses all of the steam from the outlet 97 prior to the passage of the final portions of the solvent vapor into the condenser 28 through the opening 99.

In the practice of this invention it has been found that the jets 69 and 102 condense substantially all of the solvent vapor in the manifold 98 and outlets 96 and 97 so that only a relatively small portion of the solvent vapor from the drier tubes enters the main condenser 28. The water, meal dust and solvent condensate from the outlets 96 and 97, and manifold 98, travel downwardly together through the manifold 98 and into the water-solvent separator 12 through the manifold outlet 101. The solvent vapor entering the condenser 28 through the opening 99 is condensed in the condenser section 58 and the condensate drops to the bottom of the condenser 28 and flows into the water-solvent separator 12 through the outlet 71.

Because of the upright arrangement of the manifold 98 and the short length and downward inclination of the outlets 96 and 97, as provided by the location of the drier tubes at a position adjacent to the condenser 28, any tendency of the meal dust washed from the solvent vapor to accumulate in these portions is completely eliminated, since the meal dust is effectively and continuously washed downwardly through these parts by the jets 69 and 102.

The water-solvent separator 12 operates in a well known manner in separating the solvent from the water by utilization of the differences in the relative densities of the water and the solvent. Thus assuming that the solvent is hexane, its specific density is less than that of water, so that the solvent in the separator 12 collects in a layer above the water, as indicated in Fig. 1. The solvent is continuously decanted from the water-solvent separator through a solvent outlet 106 to a suitable storage tank (not shown). The water, and impurities therein, in the normal operation of the system is siphoned through a pipe member 107 and discharged into a funnel 108 located in the control chamber 11 and connected with a waste drain 109. In the event impurities, such as meal dust, should collect in the water separator 12 to an appreciable extent, the separator 12 is completely flushed by opening a valve unit 110 in the waste drain outlet 109.

The elimination of any non-condensible gases in the system is accomplished by means including an upright vent condenser 115 (Fig. 1) carried on the base unit 10 above the separator 12, with the lower end of the condenser being open to the separator 12 and its upper end having a non-condensible vapor outlet 116 open to the atmosphere. A perforated plate member 117, spaced above the lower end of the condenser 115, supports Raschig tubes 118 which extend substantially to the upper end of the condenser 115.

Cold water is introduced into the condenser 115, adjacent its upper end for flow downwardly about the Raschig tubes 118 and into the separator 12, through an inlet 119 connected through a pipe 121 with the water pipe 55. The supply of water to the condenser 115 is controlled by a valve 122 connected in the pipe 121.

Any solvent vapor and non-condensible gases flowing upwardly through the condenser 115 from the water-solvent separator 12 travels about the Raschig tubes 118 and is acted upon by the water from the inlet 119. By virtue of this action practically all of the solvent vapor in the condenser 115 is condensed and flows with the water to the separator 12 as solvent condensate. The non-condensible gases are discharged from the condenser 115 to the atmosphere through the outlet 116.

As was described above the condenser 28 is comprised of two condenser sections 57 and 58 which are open to each other at their lower ends. The condenser section 57 operates primarily to handle solvent vapors from the miscella side of the system, while the section 58 operates primarily to handle solvent vapors from the meal side of the system. By virtue of the sections 57 and 58 being open to each other the operating pressures in both sides of the system are equalized at the water-solvent separator 12.

Thus, for example, if the sections 57 and 58 were separated from each other any pressure built up in the miscella side of the system due to a clogging of the condenser section 57 would result in solvent vapor being blown through the outlet 71 into the water-solvent separator along with a flow of solvent condensate through the outlet 71. This condition would result in a pressure build up in the solvent-water separator and the forcing or blowing of solvent vapors through the outlet 71 into the condenser section 58, and upwardly through the vent condenser 115. The operating efficiency of the condenser section 58 would, therefore, be appreciably reduced, and the vent condenser 115 overloaded relative to its capacity, as originally designed, to handle only the small portion of solvent vapor which might be entrained with the non-condensible gases in the system.

However, with the condenser sections 57 and 58 open to each other any pressure built up in either of these sections is equalized within the condenser 28 so that any blowing of solvent vapor into the water-solvent separator 12, and in turn an overloading of the vent condenser 115 and a reduced operating efficiency of the condenser 28, are completely eliminated.

To facilitate the cleaning of the Raschig tubes 79 in the stripping column 17 there is provided, immediately above the tube-supporting plate 81, a tube-removing outlet 111 which is normally closed by a cover plate 112 (Figs. 1 and 2). On removal of the plate 112 the tubes 79 are immediately accessible so as to be conveniently gathered at the outlet 111 in a container.

Access to the calandria tubes 16 for cleaning purposes is accomplished by having the inner diameter of the ring 48 in the chamber 39 of a greater diameter than the diameter of the baffle member 44 (Figs. 1 and 2). The top of the chamber 39 is normally closed by a cover plate 113 which carries the solvent vapor outlet 23. This top opening in the chamber 39 is of a size to permit a free removal of the Raschig tubes 52 from within the chamber, and the removal of the plate members 44 and 47 as a unit. On removal of this unit the calandria tubes 16 are conveniently accessible through the chamber 39.

For the purpose of clarity in the drawings the control valves for the water jets 69, 102, and 119 are illustrated as located outside of the control chamber 11. It is to be understood, however, that these valves may be arranged in the chamber 11 for convenient and ready manipulation. Further various pumping units for pumping miscella to the heat exchange unit 26; oil from the stripping column 17 to a storage tank, and steam condensate from the vaporizing column 13 and from the drier tubes 92 and toaster 94 have not been illustrated. In practice the controls for these pumping units are arranged in the control chamber 11 so that the operation of the system is completely controlled from the control chamber 11.

Although miscella and meal have been specifically referred to in the above description it is to be understood that the system is adapted for the recovery of solvent from other like oil-solvent and meal mixtures. Also although the invention has been described with respect to a preferred embodiment thereof it is to be understood that it is not to be so limited since changes and modifications in the relative arrangement and construction of the parts can be made therein which are within the full intended scope of this invention as defined by the appended claims.

I claim:

1. A system for recovering solvent collecting from an oil-solvent mixture, comprising a base unit having a solvent receptacle therein adjacent one end, an upright solvent vaporizing column supported on the opposite end of said base unit including in combination; a calandria, and a solvent stripping column concentric therewith said calandria having an oil-solvent inlet, oil separating means mounted on said vaporizing column adapted to receive solvent vapor with entrained oil from said calandria and having a solvent vapor outlet and an oil outlet connected with said stripping column, an oil outlet for said stripping column, an upright solvent vapor condenser mounted on said base unit above said solvent receptacle and communicating therewith, a heat exchange unit having a solvent vapor inlet connected with said solvent vapor outlet, means for introducing a solvent-oil mixture into said heat exchange unit prior to the admission of said mixture into said calandria oil-solvent inlet, with a portion of the solvent vapor from said solvent-vapor outlet being condensed in said heat exchange unit, a solvent vapor and condensate outlet for said heat exchange unit connected with said condenser, and a solvent vapor outlet for said stripping column connected with said condenser.

2. A system for recovering solvent from an oil-solvent mixture comprising a base unit having a water-solvent separator therein, an upright solvent vaporizing column supported on said base unit adjacent one end thereof and comprising in combination; a calandria and a solvent stripping column concentric therewith said calandria having an oil-solvent mixture inlet adjacent the lower end thereof, an oil separating unit carried at the upper end of said vaporizing column including a chamber adapted to receive solvent vapor with entrained oil from said calandria, a solvent vapor outlet adjacent the top of said chamber, an oil outlet adjacent the bottom of said chamber communicating with the upper end of said stripping column, an oil outlet adjacent the lower end of said stripping column, means for introducing steam into said stripping column to directly contact the oil therein, an upright solvent condenser carried on said base unit oppositely from said vaporizing column and having its lower end open to said water-solvent separator, a heat exchange unit arranged between the upper ends of said vaporizing column and said condenser having a solvent vapor inlet connected with the solvent vapor outlet for said chamber, means for introducing an oil-solvent mixture into said heat exchange unit, prior to the admission of said mixture into said calandria oil-solvent inlet, to be preheated therein by the solvent vapor from said oil separating means, with a portion of said solvent vapor being condensed in said heat exchange unit, a solvent vapor and condensate outlet for said heat exchange unit connected with said condenser adjacent the upper end thereof, and a solvent vapor and steam outlet adjacent the upper end of said stripping column connected with said condenser adjacent the upper end thereof, and a solvent outlet for said water-solvent separator.

3. In a system for recovering solvent from an oil-solvent mixture, an upright solvent vaporizing column including in combination; a calandria, and a solvent stripping column and a steam jacket arranged in a concentric relation with said calandria, with said stripping column being intermediate and in a heat exchange relation with said calandria and said steam jacket, means for introducing an oil-solvent mixture into said calandria adjacent its lower end for passage upwardly therethrough, means for introducing steam adjacent the upper end of said calandria for passage downwardly therethrough, means for introducing steam adjacent the lower end of said stripping column, and means for introducing steam into said steam jacket for travel downwardly therethrough, an oil-separating unit adjacent the upper end of said vaporizing column having an inlet open to said calandria to receive solvent vapor and entrained oil therefrom, an oil outlet for said separating unit connected with said stripping column adjacent the upper end thereof, an oil outlet adjacent the lower end of said stripping column, a solvent vapor outlet for said separating unit, and a solvent vapor outlet for said stripping column.

4. In a system for recovering solvent from an oil-solvent mixture, a solvent vaporizing column including in combination; a calandria, a solvent stripping column and a fluid heated jacket arranged in a concentric relation with said calandria, with said stripping column intermediate said calandria and said jacket, said stripping column being in a heat exchange relation with said calandria and said jacket, means for introducing an oil-solvent mixture adjacent one end of said calandria, means for introducing a heated fluid adjacent the opposite end of said calandria for flow through said calandria counter to the flow of said oil-solvent mixture, means for introducing a heated fluid into said jacket, an oil-solvent vapor separating unit located adjacent the opposite end of said calandria having an inlet opening to said calandria to receive solvent vapor and entrained oil therefrom, an oil outlet for said separating unit connected with said stripping column, means for introducing a stripping medium into said stripping column in contact with the oil therein, an oil outlet for said stripping column, a solvent vapor outlet for said separating unit, and a vapor outlet for said stripping column.

5. In a system for recovering solvent from an oil-solvent mixture, a solvent vaporizing column including in combination; a calandria, an annular solvent stripping column and a fluid heated jacket arranged in concentric heat exchanged relation with the stripping column, said stripping column being between the solvent vaporizing column and jacket, means providing for the flow of a heated fluid through said calandria in one direction and through said stripping column in the opposite direction, an oil-solvent inlet for said calandria, an oil-solvent vapor separating means in fluid communication with said calandria to receive solvent vapor with entrained oil therefrom, a solvent vapor outlet for said separating means, an oil outlet for said separating means connected with said stripping column, an oil outlet for said stripping column, and a vapor outlet for said stripping column.

6. In a system for recovering solvent from an oil-solvent mixture, an upright solvent vaporizing column including in combination: a calandria and a solvent stripping column positioned about said calandria, means for introducing a stripping medium into said stripping column, means for introducing an oil-solvent mixture at the lower end of said calandria for passage upwardly therethrough, means for introducing a heated fluid adjacent the upper end of said calandria for passage downwardly therethrough in a heat exchange relation with said oil-solvent mixture, with said mixture being heated by the fluid to provide for a solvent vapor with entrained oil flowing outwardly from the upper end of said calandria, means at the top of said calandria adapted to provide for the separation of the entrained oil from the solvent vapor, a solvent vapor outlet for said separating means, an oil outlet for said separating means, oil distributing means located within said stripping column adjacent the top thereof and about said calandria, oil-carrying means connected between said oil outlet and said oil-distributing means, with the oil from said distributing means dropping outwardly through said stripping column to be acted upon by the stripping medium in the stripping column, an oil outlet adjacent the lower end of said stripping column, and a vapor outlet adjacent the upper end of said stripping column.

7. In a system for recovering solvent from miscella, a solvent vaporizing column including in combination: a calandria and a solvent stripping column arranged in a heat exchange relation, means for introducing a heated fluid into said calandria, means for introducing a stripping medium into said stripping column, an oil-vapor solvent separating unit connected with said calandria to receive solvent vapor with entrained oil therefrom, a solvent vapor outlet and an oil outlet for said unit, means connecting said oil outlet with said stripping column, a vapor outlet for said stripping column, a main solvent vapor condenser, a first conduit connecting said unit vapor outlet with said main condenser, a second conduit connecting said main condenser with said stripping column vapor outlet, a fluid-solvent separator connected with said main condenser, a primary solvent vapor condenser in said first conduit, a contact condenser in said second conduit, and means for carrying solvent condensate from said primary condenser and contact condenser, and fluid from said contact condenser to said fluid-solvent separator, with the solvent vapor from said primary condenser and contact condenser being condensed in said main condenser.

8. A system for recovering solvent from an oil-solvent mixture, including a solvent vaporizing tower and a solvent stripping column arranged concentrically in a heat exchange relation, means for heating said tower and column, an oil-solvent vapor separator carried by and connected to said vaporizing tower for separating oil from the solvent vapors emanating from said vaporizing tower, and means for conveying oil from said separator to the solvent stripping colmn for vaporization therein of any residual solvent in the oil.

9. In a system for recovering solvent from an oil-solvent mixture, a base unit having a water-solvent separator therein, an upright solvent vaporizing column mounted on said base unit, an upright solvent vapor condenser supported on said base unit above said water solvent separator, with the lower end of said condenser being open to said water solvent separator, means for introducing an oil-solvent mixture into said vaporizing column to vaporize the solvent therein, solvent vapor outlet means for said vaporizing column, solvent vapor inlet means for said condenser connected with said solvent vapor outlet means, with the solvent vapor condensed in said condenser dropping to the bottom thereof and into said water-solvent separator, an upright vent condenser on said base unit for venting non-condensible gases in the system to the atmosphere having its lower end open to said water-solvent separator and its upper end open to the atmosphere, means for introducing cold water into said vent condenser in contact with the non-condensible gases and any entrained solvent vapor flowing upwardly therethrough, with the water and solvent vapor condensed by the water dropping to the bottom of said vent condenser and into said water-solvent separator, and the non-condensible gases being discharged to the atmosphere from said upper end of the vent condenser.

10. Apparatus for separating the oil and solvent phases of an oil-solvent liquid mixture, including a tower formed by substantially coextensive concentrically disposed tubular members providing separate distilling and stripping chambers, one of which surrounds the other, means for causing the flow of the oil-solvent mixture upwardly through the distilling chamber, means at the upper end of said distilling chamber for separating the liquid from the vaporized solvent, means for conducting the separated liquid to and through the stripping chamber, means for applying heat to the liquid flowing in the distilling chamber and for subjecting the undistilled liquid in the stripping chamber to a second vaporizing and oil stripping effect, and means for collecting the vaporized solvent.

11. Apparatus for separating the oil and solvent phases of an oil-solvent liquid mixture, including a tower formed by substantially coextensive concentrically disposed tubular members providing separate distilling and stripping chambers, one of which surrounds the other, means for causing the flow of oil-solvent mixture upwardly through the distilling chamber, means at the upper end of said distilling chamber for separating the liquid from the vaporized solvent, means for conducting the separated liquid to and through the stripping chamber, means for causing the flow of steam to and through at least one of said chambers to distill the solvent in the distilling chamber and for subjecting the distilled liquid in the stripping chamber to a second vaporizing and oil stripping effect, and means for collecting the vaporized solvent.

12. Apparatus for separating the oil and solvent phases of an oil-solvent liquid mixture, including a tower formed by substantially coextensive concentrically disposed tubular members providing separate distilling and stripping chambers, one of which surrounds the other, means for causing the flow of oil-solvent mixture upwardly through the distilling chamber, an oil-solvent separating unit located at the upper end of the tower and communicating with the distilling chamber, said unit including means for collecting the undistilled liquid and for intercepting and adding to it any liquid oil particles entrained and moving with the solvent vapor, means for conducting the liquid thus collected to and through the stripping chamber, means for applying heat to said chambers to distill the solvent in the distilling chamber and for subjecting the undistilled liquid in the stripping chamber to a second vaporizing and oil stripping effect, and means for collecting the vaporized solvent.

13. Apparatus for separating the oil and solvent phases of an oil-solvent liquid mixture, including a tower formed by substantially coextensive concentrically disposed tubular members providing separate distilling and stripping chambers, one of which surrounds the other, means for causing the flow of oil-solvent mixture upwardly through the distilling chamber, an oil separating unit located at the upper end of the tower and communicating with the distilling chamber, means for conducting liquid separated in said unit to and through the stripping chamber, means for applying heat to the liquid in each of said chambers for distilling the solvent in the distilling chamber and for subjecting the undistilled liquid in the stripping chamber to a second vaporizing and oil stripping effect, means in the separating unit and stripping chamber for restraining and collecting the oil from the fluid stream flowing therein, and means for collecting the vaporized solvent.

14. Apparatus for separating the oil and solvent phases of an oil-solvent liquid mixture, including a tower formed by substantially coextensive concentrically disposed tubular members providing an inner distilling chamber and an outer stripping chamber which surrounds the distilling chamber, means for causing the flow of the oil-solvent mixture upwardly through the distilling chamber, means for causing the flow of steam through said chamber to distill the solvent from the liquid flowing therein, means at the upper end of said distilling chamber and communicating therewith for separating the liquid from the vaporized solvent, means for conducting the separated liquid to and through the stripping chamber, means for supplying steam to the liquid flowing in the stripping chamber for subjecting it to a second vaporizing and oil stripping effect, and means for collecting the vaporized solvent.

15. Apparatus for separating the oil and solvent phases of an oil-solvent liquid mixture, including a tower formed by substantially coextensive concentrically disposed tubular members providing separate distilling and stripping chambers, one of which surrounds the other, means for causing the flow of oil-solvent mixture upwardly through the distilling chamber, an oil-solvent separating unit located at the upper end of the tower and communicating with the distilling chamber, said unit including a hollow casing having a foraminous upper wall, through the perforations of which the solvent vapor is discharged; a downwardly concave baffle below said foraminous wall lying above the point of communication of the unit with the distilling chamber and adapted to trap and return to the liquid stream oil entrained and moving with the solvent vapor, means for conducting the liquid collected in the separating unit to and through the stripping chamber, means for heating both the distilling and stripping chambers to distill the solvent in the distilling chamber and subject the undistilled liquid in the stripping chamber to a second vaporizing and oil stripping effect, and means for collecting the vaporized solvent.

16. Apparatus for separating the components of a mixture of oil and a solvent liquid, comprising vertically disposed calandria and stripping column members, one surrounding and coaxial with the other, the calandria having separate channels for liquid mixture and heating fluid, means for supplying liquid mixture to the lower ends of the calandria channels therefor, a solvent vapor separator mounted upon the upper end of the calandria and communicating with its liquid mixture channels, means for supplying heating fluid to the upper ends of the calandria channels therefor for downward flow therein, means for conducting liquid from the separator to the upper portion of the stripping column, and means for supplying heating fluid to the stripping column.

17. Apparatus for separating the components of a mixture of oil and a solvent liquid, comprising vertically disposed calandria and stripping column members, one surrounding and coaxial with the other, the calandria having separate channels for liquid mixture and heating fluid, means for supplying liquid mixture to the lower ends of the calandria channels therefor, a solvent vapor separator mounted upon the upper end of the calandria and communicating with its liquid mixture channels, means for supplying heating fluid to the upper ends of the calandria channels therefor for downward flow therein, means for conducting liquid from the separator to the upper portion of the stripping column, and means for supplying heating fluid to the lower end of the stripping column for upward flow therethrough.

18. Apparatus for separating the components of a mixture of oil and a solvent liquid, comprising vertically disposed calandria and stripping column members, one surrounding and coaxial with the other, the calandria having separate channels for liquid mixture and heating fluid, means for supplying liquid mixture to the lower ends of the calandria channels therefor, a solvent vapor separator mounted upon the upper end of the calandria and communicating with its liquid mixture channels, means for supplying heating fluid to the upper ends of the calandria channels therefor for downward flow therein, means for conducting liquid from the separator to the upper portion of the stripping column, means for supplying heating fluid to the stripping column, a chambered jacket surrounding and enclosing the lower portions of the said concentric members, and means for circulating heating fluid through the chamber thereof.

19. Apparatus for separating the components of a mixture of oil and a solvent liquid, comprising vertically disposed calandria and stripping column members, one surrounding and coaxial with the other, the calandria having separate channels for liquid mixture and heating fluid, means for supplying liquid mixture to the lower ends of the calandria channels therefor, a solvent vapor separator mounted upon the upper end of the calandria and communicating with its liquid mixture channels, means for supplying heating fluid to the upper ends of the calandria channels therefor for downward flow therein, means for conducting liquid from the separator to the upper portion of the stripping column, means for supplying stripping medium to the lower end of the stripping column for upward flow therethrough, a chambered jacket surrounding and enclosing the lower portions of the said concentric members, and means for circulating heating fluid through the chamber thereof.

LOUIS F. LANGHURST.

REFERENCES CITED

The following references are of record in the file of this patent:

UNITED STATES PATENTS

| Number | Name | Date |
|---|---|---|
| 263,852 | Burcey | Sept. 5, 1882 |
| 436,227 | Forbes | Sept. 9, 1890 |
| 522,130 | Turney | June 26, 1894 |
| 653,555 | Hart et al. | July 10, 1900 |
| 799,002 | Hodges et al. | Sept. 5, 1905 |
| 829,763 | Burt et al. | Aug. 28, 1906 |
| 1,403,225 | Backhaus | Jan. 10, 1922 |
| 1,890,152 | Hills | Dec. 6, 1932 |
| 1,902,538 | Brace et al. | Mar. 21, 1933 |
| 1,936,964 | Gensecke | Nov. 28, 1933 |
| 1,943,106 | Burnham | Jan. 9, 1934 |
| 2,140,623 | Hetzer | Dec. 20, 1938 |
| 2,152,665 | Rosenthal | Apr. 4, 1939 |
| 2,163,303 | Bonotto | June 20, 1939 |
| 2,224,984 | Potts et al. | Dec. 17, 1940 |
| 2,290,373 | Lee | July 21, 1942 |
| 2,310,680 | Dinley | Feb. 9, 1943 |
| 2,349,249 | Desetti et al. | May 23, 1944 |